United States Patent

Lutz

[15] 3,640,827
[45] Feb. 8, 1972

[54] PHOSPHATE GLASS BODIES
[72] Inventor: Charles William Lutz, Clark, N.J.
[73] Assignee: FMC Corporation, New York, N.Y.
[22] Filed: Oct. 9, 1968
[21] Appl. No.: 766,257

[52] U.S. Cl. ..........................252/8.55, 161/168, 106/47, 252/175, 166/310
[51] Int. Cl. ..........................C09k 1/36, E21b 37/00
[58] Field of Search..............252/8.55 B, 80, 175; 166/279, 166/310; 106/47; 161/168

[56] References Cited

UNITED STATES PATENTS

| | | | |
|---|---|---|---|
| 2,384,946 | 9/1945 | Marisic | 252/175 |
| 2,970,959 | 2/1961 | Jones | 252/8.55 B |
| 3,248,234 | 4/1966 | Godron | 106/47 |
| 3,253,934 | 5/1966 | Godron | 106/47 |
| 3,338,670 | 8/1967 | Fuchs | 106/47 |
| 3,481,749 | 12/1969 | Godron | 106/47 |

*Primary Examiner*—Morris Sussman
*Attorney*—Abner Sheffer, Eugene G. Seems and Milton Zucker

[57] ABSTRACT

Molded internally stressed bodies of phosphate glass of controlled solubility, such as small spheres of sodium phosphate glass containing one or more multivalent metal oxides and having moderate internal stress.

10 Claims, 7 Drawing Figures

PATENTED FEB 8 1972  3,640,827
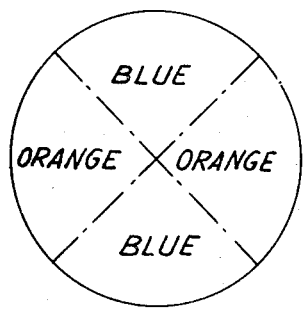
FIG.1
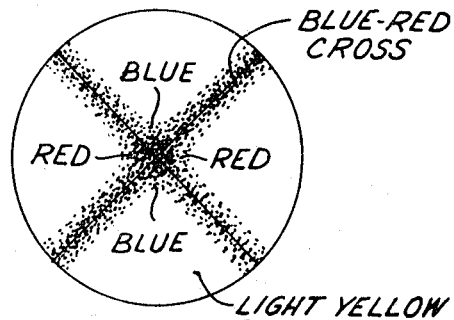
FIG.2
N
FIG.3
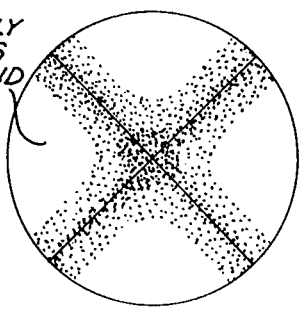
FIG.4
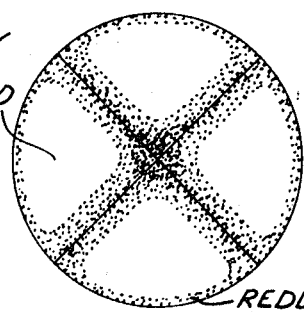
FIG.6
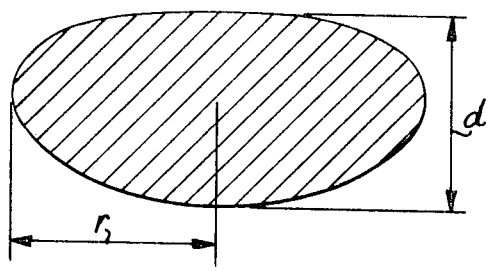
FIG.5
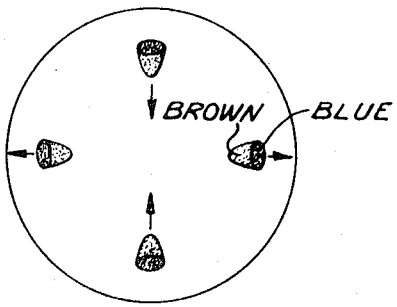
FIG.7
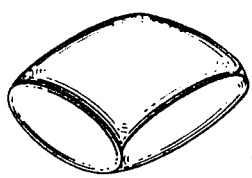
INVENTOR.
CHARLES W. LUTZ
BY Abner Sheffer
ATTORNEY

PHOSPHATE GLASS BODIES

This invention relates to phosphate glass bodies particularly suitable for slow release of polyphosphate or other desirable material to aqueous media.

Phosphate glasses of controlled solubility are well known in the art. By incorporating multiple charged or heavy metal cations in alkali metal phosphate glasses or by including certain anionic constituents (such as $SiO_2$), the alkali metal phosphate glasses can be made slowly soluble so that they will be gradually released to an aqueous medium in contact therewith but at the same time will not stick together to form a gummy base. Such glasses are discussed in the book "Phosphorus and Its Compounds" Vol. II, (J. R. Van Wazer, editor), published 1961 by Interscience, as at page 1,808 ff. Among other references showing glasses of this type are the U.S. Pat. Nos. to King 2,370,472 and 2,395,126, Enquist 2,332,209 and Hatch 2,539,305 and Fuchs 3,338,670. Controlled solubility phosphate glasses are used, for example, to prevent scale formation in oilfield equipment in contact with the brines present in oil wells. Particles of these glasses are dropped in measured quantity, down the annulus of a producing well. Once in the well they have a "self-feeding" action, dissolving slowly so as to add a few parts per million of phosphate to the water in the well continuously. Of course this procedure is also useful where such known techniques as water flooding or steam flooding are used to force oil from oil-bearing strata into the well.

The phosphate glasses of controlled solubility are usually sodium phosphate glasses containing above about 1 percent of one or more polyvalent solution rate-controlling agents, (e.g., CaO or $Al_2O_3$ or CuO etc.) and are used in the form of particles or lumps. Typically their $P_2O_5$ content is well above 50 percent, e.g., 67 or 68 percent.

Most commonly the phosphate glasses of controlled solubility are supplied as lumps or granules of irregular shape made by breaking up a larger glassy mass. In one technique the molten glass is cast as a plate of predetermined thickness onto a rotating horizontal cooled metal "chill wheel" on which the cast plate shatters; the broken pieces are then screened to obtain groups of pieces of various predetermined size ranges.

In accordance with one aspect of this invention there are produced molded bodies of the slowly soluble phosphate glasses of uniform size and shape. The molded bodies may, for example, be spherical or spheroidal or relatively flat circular pellets, or hemispherical, or pillow shaped. They generally have at least one axis or plane of symmetry. They are produced by a process in which they attain substantially their final shape while still in a hot plastic condition; thus, they may be cast into a mold, which may be an open mold, such as an uncovered cavity, or a multipart (e.g., two-part) substantially closed mold, e.g., a series of matching hemispherical cups, which separate to permit discharge of the molded sphere. The still-plastic and workable material may be shaped by moving mold elements (as in a conventional marble-making machine in which the molten glass slowly oozes through an orifice, is cut to form squat cylinders which fall down a chute to a pair of parallel, generally horizontal rotating worms, in whose grooves the glass bodies are shaped into spherical form and cooled). The molded bodies may also attain their final shape by the effect of surface tension; e.g., spheres may be formed in a shottower. The molded bodies will generally range from about 3 mm. to 40 mm. or more in diameter (smallest to largest dimension), such as spheres 5 mm. to 20 mm. in diameter.

In the production of objects of the usual glasses used for structural purposes (e.g., conventional silicate glasses) it is common to anneal the glass so as to substantially remove all stresses that have been frozen in on cooling. I have found that molded bodies of the phosphate glass that are substantially free of internal stress behave poorly during their slow dissolution in water or brine. Thus, they tend to crack and to form insoluble phosphates. Surprisingly, I have found that molded bodies of the phosphate glass that have moderate internal stress show superior behavior during such dissolution. As an example, spheres of moderately stressed phosphate glass have continued to perform well (retaining their uncracked spherical shape and dissolving uniformly) even after brine at 90° C. has been pumped through a bed of such spheres for some 1,350 hours or more and some 60 percent of the mass of material has been dissolved.

The presence of stress and a quantitative measure of the degree of stress can be detected optically by the use of a Friedel polarimeter, such as the "S-B Polarimeter" made by S. D. Burdick, Corning, N.Y. While this instrument is designed for use with silicate glasses of the usual type, which are essentially insoluble, it has now been found to be useful in indicating the stress condition of the molded bodies of phosphate glass used in this invention.

In the "S-B Polarimeter" white light passes through a diffuser, then through a polarizer, then through the specimen, then through either a tint plate (a half-wave plate) or through a quarter-wave plate, and finally through an analyzer (which is another polarizer). More particularly the instrument comprises a Polaroid film (the polarizer) mounted between a cover glass and a diffusing glass and illuminated from below by an incandescent electric bulb. In use, the specimen (i.e., a body of glass of unknown internal stress) may be placed directly on the cover glass or, if desired, in a suitable clear unstressed glass dish resting on the cover glass, so that the polarized light passes upward through the specimen. Supported at a fixed distance above the cover glass is an eyepiece which has another Polaroid filter (the analyzer) mounted in a rotor having an angular scale reading in degrees. Underneath the eyepiece is a slide in which are mounted the tint plate and the quarter-wave plate, so that by moving the slide one can place either the tint plate or the quarter-wave plate in the path of the light passing upward to the eyepiece. When the eyepiece is set at 0° the polarizer and the analyzer are in crossed position, i.e., their Z-axes are at right angles to each other.

With the tint plate in the light path, the eyepiece is always set at zero and the instrument operates as an ordinary polariscope. When a molded specimen of conventional silicate glass (e.g., a piece of window glass) is examined under these conditions the stress in the glass will be indicated by a color, either a shade of blue-green or yellow-orange, depending on the position of the glass on the field and on the type of stress, whether tension or compression; the particular directions and stresses can be checked, for instance, by use of samples of similar glass of known tension and compression.

When the quarter-wave plate is in the path of the light the instrument can function as a polarimeter; in this case the eyepiece is rotated manually to compensate for the effect of the stress in the glass and the amount of such rotation in degrees gives an indication of the amount of stress.

For example, when a flat molded article of conventional silicate glass is examined under these conditions, with the specimen placed on the field with the direction of its principal stresses at an angle of 45° to the neutral axes of the instrument, and the quarter-wave plate is in the light path, rotation of the eyepiece from the zero position causes the observed black neutral band to move and to acquire color, roughly blue on the leading edge and reddish brown on the trailing edge. "Compensation" is reached when the eyepiece is rotated sufficiently to cause boundary between the blue color and the red or brown to travel to the point on the specimen where the stress is to be measured. The stress (S) can then be computed by the formula $S=KA/tc$ where $S$ is the stress in kg./mm.$^2$, $K$ is a constant, $A$ is the angle of rotation of the eyepiece necessary to give compensation, $t$ is the thickness of the glass specimen in millimeters and $c$ is the birefringence constant of the glass. The birefringence constant is expressed in the units m$\mu$/cm. per kg./mm.$^2$. Typical borosilicate glass (Corning 7740) used for the manufacture of laboratory and pharmaceutical ware has a birefringence constant of 380, while most soda-lime silicate glasses have birefringence constants of about 250; for the phosphate glasses we have tested thus far the birefringence constant has been about 150 to 175 m$\mu$/cm. per kg./mm$^2$. In the silicate glass industry, a glass is considered to be "commercially annealed" (unstressed) when the internal stress does not exceed 250 lb./in.$^2$; the products show substantially no colored birefringence pattern when viewed in the polariscope.

The drawings (FIGS. 1–5) illustrate roughly the optical effects obtained by the use of the "S-B Polarimeter" with specimens of molded phosphate glass of controlled solubility. FIG. 6 is a side view of a cast circular pellet, described in Example 1 and FIG. 7 is a perspective view of another shape of pellet.

FIG. 1 is a view of a sphere of the phosphate glass having moderate internal stress, with the tint plate in the light path. Here, the presence of moderate internal stress is shown by a colored pattern divided roughly into quadrants of contrasting colors, with opposite quadrants being of the same color. Thus a spherical bead of moderately stressed colorless glass appears as having alternating strongly orange and blue quadrants. The bead is substantially uniform, as shown by the fact that on rotation of the bead in the field (e.g. rotation about a horizontal or a vertical axis, and through different angles) it still shows substantially the same pattern.

When the stress in the sphere of the same phosphate glass is severe, one observes, instead of the quadrants of contrasting colors, a distinct blue-red cross on a yellow (usually light yellow) background, as shown in FIG. 2. When, however, the phosphate glass sphere is unstressed, no color pattern is observed.

For moderately stressed spheres, when the quarter-wave plate is placed in the light path a black cross is observed, when the eyepiece rotor is set at zero, as shown in FIG. 3. As the eyepiece rotor is turned (e.g., counterclockwise) the cross breaks up into black bands which become more colored and move toward the edge of the glass body, the bands being blue on the leading edges (that is the edges furthest from the center) and brown on the trailing edges.

For severely stressed spheres the effects of the use of the quarter-wave plate are similar as shown in FIG. 4. Here the black cross breaks up into four spaced dots on rotation of the eyepiece (as shown in FIG. 5); as the eyepiece is rotated more, (e.g., counterclockwise) the dots of one opposed pair (e.g., those in the East, West positions) move outward toward the boundary of the sphere, while the dots of the other opposed pair begin to move toward the center, as shown by the arrows on FIG. 5.

The same optical effects are also visible when other uniform bodies of circular cross section are observed with the light travelling parallel to the axis of radial symmetry of the body. This has been shown both with circular pellets of the general shape illustrated in FIG. 6 and cylinders. When, however, such bodies are viewed with the light travelling along a path perpendicular to the axis of radial symmetry of the object the effects are different. Thus when a moderately stressed cylindrical body was so viewed with the cylindrical body having its axis at 45° to the neutral axes of the instrument, colored bands running parallel to the axis of the cylinder were visible when the tint plate was in the light path; when the quarter-wave plate was placed in the light path, the arrangement otherwise being the same, two black lines parallel to the axis of the cylinder were seen and when the eyepiece was rotated to the left or right these two lines either moved apart, towards the edges of the cylinder or converged at its axis, depending on the direction of rotation. Other uniformly shaped bodies having parallel sides show similar optical effects.

When a moderately stressed circular pellet as illustrated in FIG. 6 was viewed on edge (that is, with the light travelling along a path perpendicular to the axis of radial symmetry of the pellet) the following observations were made, with the pellet oriented in two different positions in the field (in one position the longest dimension, as seen in the field, ran N–S, while in the other position said longest dimension ran E–W in the field, so that in both these positions said longest dimension was at 45° to the neutral axes of the instrument). In both positions no pattern was visible with the tint plate in the light path, and the pellet appeared substantially all yellowish or all bluish, depending on the orientation; the effect of orientation on color was that normally characteristic of the presence of tensile, rather than compressive, stress. When the quarter-wave plate was placed in the light path and the eyepiece was rotated in a direction normally used to measure the degree of compressive stress, no pattern of lines appeared, but when the eyepiece was rotated in a direction normally used to measure the degree of tensile stress a pair of black lines roughly parallel to the edges appeared and these lines moved to converge in the middle as the eyepiece was rotated.

While the principal indication of the presence of moderate internal stress is shown by the pattern seen in the polariscope, one can in many cases check the effects in some numerical terms by using the instrument as a polarimeter, rotating the eyepiece in the direction to cause the observed bands or dots to move toward the edge of the glass body until the boundary between the blue and the brown colors just reaches the edge of the body (so that all the blue appears to have disappeared over the edge of the glass body), or in a direction to cause an observed pair of parallel bands to move toward each other until these bands meet at the middle of the body. The angle or rotation to accomplish this ($A$) divided by a function ($T$) of a dimension, e.g., thickness, of the glass body gives some indication of the magnitude of the internal stress. On thus examining with the polarimeter a series of shaped glass bodies, all of which showed substantially identical patterns (in terms of color and intensity) in the polariscope and all of whose cross sections transverse to the light path were circular, I found that their $A/T$ values are also substantially identical if one takes the following values for $T$: for a sphere take $T$ as equal to the radius: for hemisphere (obtained when a sphere was cracked in two during its manufacture) take $T$ as equal to the radius; for a circular pellet shown in FIG. 6, whose radius is $r$ and whose maximum thickness (at the center) is $d$, ($d$ being equal to $r$ in this particular case) take $T$ as equal to $d$. So calculated, the $A/T$ values for moderately stressed spheres are generally well above 2°/mm. and preferably at least 3°/mm. and well below 40°/mm., e.g., less than 30°/mm. I have found that the optimum range is also dependent on the particular glass composition. Thus, for a glass whose empirical composition is about 4 percent $Al_2O_3$ 8 percent $CaO$, 67 percent $P_2O_5$ and the remainder $Na_2O$ (whose birefringence constant is 170) the optimum $A/T$ value is above about 4°/mm., but when the glass has the same $Al_2O_3$ and $CaO$ contents (i.e., about 4 percent and 8 percent, respectively) but contains 70 percent $P_2O_5$ the $A/T$ value may be still lower (e.g., 3°/mm.) with very good results. On the other hand, for a glass whose empirical composition is about 18 percent $CaO$, 69 percent $P_2O_5$ and the remainder $Na_2O$ the optimum $A/T$ value is above about 5°/mm.

The birefringence patterns caused by the presence of internal stress are, of course, most readily observed on objects of colorless glass. Similar effects have, however, been observed with colored glasses, even, for example, with glasses colored dark green due to the presence of copper oxides in the glass.

The foregoing observations were made with an "S-B Polarimeter, Model 33" (sold by S. D. Burdick of Corning, N.Y.), which is a portable device having a field of 6 inches diameter using an ordinary 40-watt bulb as the light source and having heat-absorbing glass between the light source and the field. In this instrument the height of the eyepiece above the field (i.e., above the cover glass) is adjustable to 6 inches; changes in the height of the eyepiece have not been found to change the appearance of the phosphate glass body, as viewed through the eyepiece, or the magnitude of the angle or rotation needed to compensate for the stress in the body. The "neutral axes" of the instrument are marked on the eyepiece by indicia extending in two straight diametrical lines at right angles to each other across the circular field of the instrument; the orientation of FIGS. 1–5 is such that these neutral axes extend NE–SW and SE–NW, taking north as the upward direction on the paper as is conventional.

The moderate internal stress may be induced in the glass body in various ways, some of which are illustrated in the examples below. One technique is to control the rate of cooling of the molded body, as by using a mold which had been preheated to a predetermined temperature; this temperature can be determined by preliminary tests in which various temperatures are used while the other conditions are kept constant and the resulting bodies are examined in the polariscope. Another technique is to mold the glass bodies under such conditions (e.g., rapid cooling) that severe stresses are frozen in, and then to partially anneal the bodies under conditions predetermined by preliminary testing, e.g., by heating for a short time at a temperature below the "annealing point" but above the "strain point."

While the polariscope-polarimeter described above can only measure a resultant stress in the glass body and, in a uniformly shaped body, cannot distinguish between types of stress (e.g., between compression and tension stresses) or give an indication of the cause of the stress, it would seem that theoretically the internal stress caused, for example, by rapid cooling would be due to an initial solidification of the cooler exterior portion of the body while the interior portion is still plastic. On subsequent cooling of the interior, the resulting shrinkage thereof would be expected to cause the exterior portions of the glass body to be stressed compressively while the interior is in tension; or the stress tangential to the surface may be in compression while the stress normal to the surface (e.g., radial stress) may be in tension. We have not observed any marked change in the optical stress pattern on partial dissolution of the glass bodies (e.g., after about 50 percent of the glass had dissolved and the diameter of the body was only about 80 percent of its original value), however. Also we have not observed any change in the stress pattern or significant reduction in stress on heating the glass bodies in dry condition for extended periods at a temperature of 100° C., which is well below the strain point of the glass.

For best results the molded bodies should be substantially free of entrapped air and impurities.

In one preferred form of the invention there is used a mass of separate glass bodies in which each such body is of substantially the same size and shape as the other bodies of that mass. Thus, the mass may be a bed of hundreds or thousands of smooth-surfaced spheres of substantially equal diameters. Products of this type cannot be obtained by the conventional method of breaking up a large body of glass to form lumps or granules and then screening the broken material into predetermined size ranges.

The form of the invention in which the glass bodies are of spheroidal shape (most preferably substantially spherical shape) has special advantages. The glass bodies can roll easily over one another which overcomes the danger of "bridging" or blockage in oil wells, especially in nonlinear drilled wells. A bed of the spheroids provides point-to-point contact, allowing maximum liquid flow through the bed and providing maximum effective glass surface area. Also the danger of the bed "cementing" together is reduced as a result of point-to-point contact; "cementing" frequently occurs in beds of "chunks" or fractured-plate and not only reduces efficiency of the treatment but can interrupt oil-well operation. The surface area of the spheroidal bodies is low in relation to their weight (and the bodies retain the spheroidal shape during dissolution) thus giving a desirable slow rate of dissolution.

The following examples are given to illustrate this invention further. In these examples, as in the rest of the application, all proportions are by weight unless otherwise indicated.

EXAMPLE 1

A well-blended mixture of

| | |
|---|---|
| 6.12 g. | $Al_2O_3 \cdot 3H_2O$ |
| 0.95 g. | $CaCO_3$ |
| 33.6 g. | $Ca(H_2PO_4)_2 \cdot H_2O$ |
| 81.3 g. | $NaH_2PO_4$ | contained in a platinum dish was heated for one-half hour at 900° C. in an electric muffle furnace. The resulting clear, mobile melt was poured into circular depressions (21 mm. across and 7.5 mm. deep) in a porcelain plate maintained at 25° C. The resulting glass had the following weight percent composition: 4 $Al_2O_3$, 8 CaO, 21 $Na_2O$, and 67 $P_2O_5$ and was in the form of circular pellets 16 mm. in diameter and 8 mm. thick having a cross section as shown in FIG. 6. On examination in the polariscope they were found to show the pattern corresponding to severe stress (described above). In an accelerated test of the dissolving behavior of the pellets, in which some of the pellets were immersed in distilled water at 100° C. for 48 hours, the pellets broke into pieces.

Some of the original cast pellets were heated at 350° C. for one-half hour (in an electric furnace); the resulting annealed pellets were found to be essentially free of stress, on examination in the polariscope, showing no colored pattern. When subjected to the accelerated dissolving test described above the annealed pellets cracked severely and showed formation of insoluble phosphates.

When, however, some of the original cast pellets were heated at 310° C. for one-half hour (in an electric furnace) the resulting partially annealed pellets were found, on examination in the polariscope, to show the characteristic pattern of moderate stress; their $A/T$ values (using 8 mm. as $T$) were 8 to 10°/mm. When subjected to the accelerated dissolving test described above, they were found to be intact (though, of course, of smaller size as the result of dissolution) and uniformly dissolved. Furthermore, in extended dissolving tests, also at 100° C., lasting some 32 days it was found that these pellets remained essentially intact and had a relatively uniform dissolving rate; thus, the pellets lost 25 percent of their weight by dissolution in 8 days, 50 percent in 19 days and 75 percent in 32 days. After a 65 percent weight loss by dissolution the average diameter: thickness ratio (originally about 2.2) was about 2.8, and, accordingly, the surface area of the pellets was only slightly less than its value before any dissolution had taken place.

The phosphate glass used in this Example 1 has the following characteristics. Its "strain point" (i.e., the temperature at which the logarithm of the viscosity in poises is 14.5) is 320° C. Its "annealing point" (i.e., the temperature at which the logarithm of the viscosity in poises is 13.0) is 338° C. and its "melting temperature" (i.e., the temperature at which the logarithm of the viscosity in poises is 2.0) is 714° C. (a mobile melt is not formed until the temperature is somewhat higher, e.g., on the order of 200° C. higher). Its birefringence constant is 1.7 m$\mu$/cm. per kg./cm.$^2$. Its intrinsic density is about 2.6 g./cm.$^3$, but the bulk density of the pellets of this example is about 1.5 g./cm.$^3$.

EXAMPLE 2

A well-blended mixture of

| | |
|---|---|
| 7.65 g. | $Al_2O_3 \cdot 3H_2O$ |
| 17.86 g. | $CaCO_3$ |
| 30.77 g. | $Na_2CO_3$ |
| 123.3 g. | 75% $H_3PO_4$ | was heated for one-half hour at 900° C. in an electric muffle furnace. The resulting clear, mobile melt was poured into the porcelain plate described in Example 1 and the resulting glass pellets, of the same shape as in Example 1, had the following weight percent composition: 5 $Al_2O_3$, 10 CaO, 18 $Na_2O$, and 67 $P_2O_5$. Severely stressed, moderately stressed, and substantially unstressed pellets were obtained by preheating the porcelain plate (i.e., the mold) to different temperatures, namely 180° C., 200° C. and 250° C. respectively, just prior to pouring the glass thereinto. In all cases the pellets were allowed to form and cool for 1 hour (down to a temperature of about 60° C.) without supplying external heat.

The phosphate glass used in this Example 2 had a relatively low dissolution rate. Accordingly the dissolving test was carried out as in Example 1, but for 120 hours. At the end of this test period the unstressed pellets were found to have cracked to pieces and contained insoluble material. The moderately stressed pellets were intact and had dissolved uniformly, and the severely stressed pellets were found to have broken to pieces and contained insoluble material. In a further test, for 79 days under the same conditions, the moderately stressed pellets remained intact even after 83 percent of their weight was lost by dissolution.

The phosphate glass used in this Example 2 has the following characteristics. Its strain point, annealing point and melting temperature (all as defined above) are 360° C., 381° C. and 782° C. respectively. Its birefringence constant is 1.65 $m\mu$/cm. per kg./cm². The moderately stressed pellets had $A/T$ values of about 8 to 13°/mm. (using 8 mm. as $T$).

EXAMPLE 3

A well-blended mixture of

| 31.87 g. | $CaCO_3$ |
| 49.74 g. | $NaH_2PO_4$ |
| 73.38 g. | 75% $H_3PO_4$ | was heated and chilled to form glass pellets as described in Example 1. The composition (weight percent) of the glass was 17.85 CaO, 12.85 $Na_2O$, and 69.3 $P_2O_5$. The resulting severely stressed pellets were heated for one-half hour at 350° C. to achieve unstressed pellets.

The pellets were tested as in Example 1, for their behavior in water at 100° C., except that the time of immersion was 23 hours. At the end of this time it was found that both the unstressed pellets and the severely stressed pellets had lost their glassy characteristics and deteriorated into soft insoluble masses, while the moderately stressed pellets were glassy, intact, and dissolved uniformly.

The phosphate glass used in this Example 3 has the following characteristics: its strain point and annealing point are respectively, about 353° C. and about 375° C. The $A/T$ values (using 8 mm. as $T$) of the moderately stressed pellets were 6 to 7°/mm.

EXAMPLE 4

A well-blended mixture of

| 23.01 g. | $MgCO_3$ |
| 16.96 g. | $CaCO_3$ |
| 47.61 g. | $NaH_2PO_4$ |
| 71.83 g. | 75% $H_3PO_4$ | was heated and chilled to form glass pellets as described in Example 1. The composition (weight percent) of the glass was 11.0 MgO, 9.5 CaO, 12.3 $Na_2O$, and 67.2 $P_2O_5$. The resulting severely stressed pellets were heated for one-half hour at 400° C. to obtain moderate stress and heated for one-half hour at 450° C. to achieve unstressed pellets.

When the pellets were exposed to 100° C. distilled water (as in Example 1) for 120 hours, it was found that the unstressed pellets had cracked to pieces and developed insoluble material, the moderately stressed pellets were intact and dissolved uniformly, and the severely stressed pellets had broken to pieces and developed insoluble material.

The phosphate glass used in this Example 4 has the following characteristics: its strain point and annealing point are, respectively, about 401° C. and 424° C. The $A/T$ values (using 8 mm. as $T$) of the moderately stressed pellets were 7 to 9°/mm.

EXAMPLE 5

A well-blended mixture of

| 1.68 g. | $Al_2O_3 \cdot 3H_2O$ |
| 6.25 g. | $CaCO_3$ |
| 47.44 g. | $Na_2CO_3$ |
| 123.3 g. | 75% $H_3PO_4$ | was heated and chilled as described in Example 2. The final composition of this glass in weight percent was 1.75 percent $Al_2O_3$, 3.5 percent CaO, 27.75 percent $Na_2O$ and 67.0 percent $P_2O_5$. Severely stressed, moderately stressed, and substantially unstressed pellets were obtained by using a plate (mold) preheated to 80° C., 100° C. and 150° C. respectively.

When the pellets were tested by immersing them in distilled water at 25° C. for 48 hours, the unstressed pellets were deeply grooved or cracked to pieces, the moderately stressed pellets were intact and had dissolved uniformly, and the severely stressed pellets dissolved irregularly and became fragile, and developed some insoluble material.

The glass had a strain point of 278° C. and an annealing point of 294° C. The $A/T$ values (using 8 mm. as $T$) of the moderately stressed pellets were 5° to 6°/mm.

EXAMPLE 6

A well-blended mixture of

| 6.13 g. | $Al_2O_3 \cdot 3H_2O$ |
| 24.53 g. | $CaHPO_4 \cdot 2H_2O$ |
| 68.9 g. | $NaH_2PO_4$ |
| 31.4 g. | 85% $H_3PO_4$ | was heated for one-half hour at 1,000° C. in a muffle furnace. The melt was poured into the depressions of an air-cooled porcelain plate to produce severely stressed pellets of glass having the composition (weight percent) 3.97 $Al_2O_3$, 7.94 CaO, 17.68 $Na_2O$, and 70.41 $P_2O_5$ and of configuration like that of Example 1. One of the pellets was heated for one-half hour at 320° C. to reduce the stress to moderate. Two severely stressed pellets were heated for one-half hour at 380° C. to substantially remove the stress. On testing the pellets by immersion in distilled water at 100° C. for 120 hours, both the unstressed pellets cracked and developed insoluble material, while the moderately stressed pellet (whose $A/T$ value, using 8 mm. as $T$, was 3° mm.) remained intact and dissolved uniformly.

EXAMPLE 7

A well-blended mixture of

| 6.12 lbs. | $Al_2O_3 \cdot 3H_2O$ |
| 14.29 lbs. | $CaCO_3$ |
| 35.90 lbs. | $Na_2CO_3$ |
| 123.30 lbs. | 75% $H_3PO_4$ | was fed to a refractory-lined, gas-fired furnace. The clear, mobile melt was partially cooled and fed to a conventional marble-making machine with air-cooled steel rollers designed to make ⅜-inch marbles. The glass composition (weight percent) was 4 $Al_2O_3$, 8 CaO, 21 $Na_2O$, and 67 $P_2O_5$, like that of Example 1. The "marbles" were spheres about 9 mm. in diameter with severe stress. Some of the spheres were reduced to moderate stress by heating for one-half hour at 310° C. and some spheres had their stress substantially removed by heating for one-half hour at 350° C.

When the spheres were immersed in 100° C. distilled water for 48 hours, the unstressed spheres cracked and developed insoluble material, the moderately stressed spheres remained intact and dissolved uniformly even after more than 83 percent of the original weight was dissolved (i.e., after 30 days of this test), while the severely stressed spheres broke to pieces.

In the marble-making process, cut gobs (squat cylinders) of highly viscous melt (e.g., having a viscosity of about $10^3$ poise) were fed to cooled steel rollers, which, as previously indicated, were parallel generally horizontal (slightly inclined) worms in whose grooves the gobs were formed into spheres and cooled.

The $A/T$ values of the moderately stressed spheres, using the value of the radius (4.5 mm.) as $T$, were 8° to 10°/mm.

EXAMPLE 8

Example 7 was repeated except that the "marbles" were of one-half inch diameter and another marble-making machine with air-cooled rolls (worms) was used. The marbles (having different degrees of stress as a result of the treatments described in Example 7) were subjected to the same 48-hour boiling distilled water test, with the same results. The $A/T$ value of the moderately stressed marbles, calculated by using the value of the radius (6.3 mm.) as $T$, was about 12°/mm.

EXAMPLE 9

A well-blended mixture of

| 5.54 lbs. | $Al_2O_3 \cdot 3H_2O$ |
| 12.95 lbs. | $CaCO_3$ |
| 9.40 lbs. | $Na_2B_4O_7$ |
| 32.54 lbs. | $Na_2CO_3$ |
| 111.71 lbs. | 75% $H_3PO_4$ | was fed to the furnace described in Example 7. Spheres were formed and prepared in the various stress conditions as described in Example 7. The glass composition (weight percent) was 3,62 $Al_2O_3$, 7.25 CaO, 6.50 $B_2O_3$, 21.93 $Na_2O$, and 60.7 $P_2O_5$.

Test conditions and results were the same as in Example 7.

EXAMPLE 10

A well-blended mixture of

| 6.12 lbs. | $Al_2O_3 \cdot 3H_2O$ |
| 14.22 lbs. | $CaCO_3$ |
| 0.05 lbs. | CoO |
| 35.82 lbs. | $Na_2CO_3$ |
| 123.30 lbs. | 75% $H_3PO_4$ | was fed to the furnace described in Example 7. Spheres were formed and prepared in the various stress conditions as described in Example 7. The glass composition (weight percent) was 4.0 $Al_2O_3$, 8.0 CaO, 0.05 CaO, 20.95 $Na_2O$, and 67.0 $P_2O_5$.

Test conditions and results were the same as in example 7.

EXAMPLE 11

A well-blended mixture of

| 2.97 lbs. | $Al_2O_3 \cdot 3H_2O$ |
| 6.93 lbs. | $CaCO_3$ |
| 2.93 lbs. | CuO |
| 44.81 lbs. | $Na_2CO_3$ |
| 119.70 lbs. | 75% $H_3PO_4$ | was fed to a furnace and the glass formed into spheres as described in Example 8. The glass composition (weight percent) was 1.94 $Al_2O_3$, 3.88 CaO, 2.93 CuO, 26.21 $Na_2O$, and 65.04 $P_2O_5$. Moderate stress was obtained by heating an originally severely stressed sphere for one-half hour at 275° C. An unstressed sphere was obtained by heating an originally severely stressed sphere for one-half hour at 320° C.

The spheres were tested by exposing them to 100° C. distilled water for 5 minutes.

Results were similar to those in Example 7.

The $A/T$ value, calculated as in Example 8, of the moderately stressed sphere was 9°/mm.

EXAMPLE 12

In another test moderately stressed uniform spheres produced as in Example 7 were immersed in boiling distilled water for 750 hours. At the end of the test the spheres were intact and spherical and under the polariscope they still showed the pattern of moderate stress. Furthermore, even though their diameters were of course greatly reduced, 80 percent of the material having been lost by dissolution, the $A/T$ value remained fairly constant; originally it ranged from 7.5 to 13.0° per mm. (calculated as in Example 7), prior to dissolving, while after the test it ranged from 6° to 8° per mm. (taking the final radius as $T$), there being a decrease in the stress, so measured, for each sphere during the dissolving process. The average rates of solution were as follows:

for the first 25 percent dissolved: 0.88 mg./hr.
for the second 25 percent dissolved: 0.81 mg./hr.
for the third 25 percent dissolved: 0.63 mg./hr.

This unexpected almost constant rate is believed to be due to slight surface irregularities (not readily visible to the naked eye, apparent under four-fold magnification) which develop on the originally relatively smooth surfaces during dissolving.

EXAMPLE 13

A squat circular cylinder was prepared by casting and grinding glass having the composition of Example 1. The cylinder had a radius of 5.3 mm. and an axial length of 5.7 mm. It was suitably heat treated to induce moderate internal stress therein. When viewed in the polarimeter (using the quarter-wave plate) with the general direction of the incident light being axial the interference pattern was similar to that for a moderately stressed sphere and the angle of rotation (to cause the boundaries between brown and blue to reach the edge or converge at the center) was the same (58°) for each direction of rotation of the eyepiece; the $A/T$ value, taking the axial length as $T$, is thus 10.2° per mm. When similarly viewed with the direction of the incident light normal to the axis of the cylinder and with the axis oriented so that the black lines due to birefringence were parallel to that axis, the angle A (as shown by the black lines moving to the outer edges of the cylinder, when the eyepiece was rotated counter clockwise (which is the direction normally used to measure compressive stress) was 60°; when the eyepiece was rotated clockwise (which is the direction normally used to measure compressive stress) the angle A for compensation (as shown by the black lines converging at the axis) was 50°. Thus the values of $A/T$ taking the radius of the cylinder as $T$, were 11.3° per mm. and 9.5° per mm. respectively, averaging 10.4° per mm.

EXAMPLE 14

The melt of Example 6 was cast into the form of bars of roughly circular cross section 80 mm. long and about 9 to 11 mm. in thickness. By suitable heat treatment, as in Example 6, products of various internal stress were obtained. On testing for 23 hours in 200° C. distilled water the unstressed bars cracked, the moderately stressed bars dissolved uniformly, while the edges of the severely stressed bars chipped. The appearance of the bar, lying on its side in the polariscope, was similar to that of the cylinder in the same position, as described in Example 13.

EXAMPLE 15

A series of various shapes of glass having the composition given in Example 1 and having various stress conditions was subjected to dissolution in hot brine, as described below. The shapes included: spherical "marbles" of about 9 mm. diameter (having, in some cases, substantially no stress and, in other cases, moderate stress therein, as shown by examination with the polariscope); hemispheres of about 9 mm. diameter, composed of spheres which had cracked in two during manufacture, the hemispheres having, in some cases, substantially no stress and, in other cases, moderate stress therein, as shown by the examination with the polariscope; and flat circular cast pellets 18 mm. in diameter and 8 mm. in thickness which had severe stress therein. During the test the substantially unstressed units fractured and developed insoluble white material, the highly stressed units developed deep grooves on their edges, but (aside from the uniform removal of material by dissolution) the moderately stressed units were substantially unchanged. the units were examined with the polariscope after the dissolution test and their stress conditions were found to be still within their original classifications prior to the dissolution test.

In the dissolution test with hot brine three types of brine were used, as follows:

| Type | % Cl | p.p.m. $CaCO_3$ Hardness | | Total Dissolved Solids |
| --- | --- | --- | --- | --- |
| | | Ca | Mg | (p.p.m.) |

| A | 8 | 1000 | 500 | 130,000 |
| B | 4 | 500 | 250 | 65,000 |
| C | 0.7 | 90 | 45 | 12,000 |

Temperatures of 60° C. and 92° C. were used. A charge of 4 liters (per test) of the hot brine was passed through a bed of 500 grams of the glass shapes at a rate of 100 gallons per day.

In the foregoing examples reference has been made to the "strain point" and the "annealing point." In the structural (silicate) glass industry it is known that at the annealing point (the temperature at which the log viscosity is 13.0) the internal stress in a glass is reduced to a commercially acceptable limit in 15 minutes while at the strain point (the temperature at which the log viscosity is 14.5) the internal stress is substantially relieved only after 4 hours (see "Glass Engineering Handbook" by E. B. Shand, Published 1950 by McGraw Hill, pages 21 and 22).

This invention makes possible the production of beds of glass bodies having desirable slow and relatively uniform dissolving characteristics, having suitable mechanical strength and resistance to thermal shock.

The glass used in the practice of this invention preferably has a high content of soluble longer chain polyphosphate molecules. Thus the proportion of the total $P_2O_5$ content which is present as orthophosphates (taken together) is preferably well below 50 percent, e.g., less than 20 percent, and most preferably not over about 10 percent. Typical approximate values (as determined by paper chromatography; see Analytical Chemistry 35 769 [1963]) for the glass compositions of some of the above examples are given in the following table:

| Example | $P_2O_5$ distribution, by percent | | | |
| --- | --- | --- | --- | --- |
| | ortho | pyro | tripoly | "higher" |
| 1 | — | 13 | 13 | 73 |
| 4 | — | — | 20 | 80 |
| 6 | — | — | 7 | 93 |
| 7 | — | 15 | 19 | 66 |
| 10 | — | 10 | 12 | 78 |

"Higher" includes phosphates which have chain lengths above 3, and also includes cyclic phosphates.

While the examples have dealt specifically with spheres, rods, cylinders, and pellets of the type illustrated in FIG. 6, it will be understood that other molded shapes may be used; thus smooth shapes having rounded corners, such as the protuberance-free pillow-shape body sown in FIG. 7, may be employed.

It is understood that the foregoing detailed description is given merely by way of illustration and that variations may be made therein without departing from the spirit of the invention. An "Abstract" given above is merely for the convenience of technical searchers and is not to be given any weight with respect to the scope of the invention.

I claim:

1. Molded internally stressed bodies, of controlled solubility phosphate glass, said bodies being adapted to be used in oil wells for prevention of scale formation and in contact with brines present in oil wells, said controlled solubility glass being a vitreous polyphosphate fusion product which consists essentially of a complex of $P_2O_5$, an alkali metal oxide and one or more polyvalent metal oxide, the proportion of polyvalent meal oxide being at least about 1 percent and up to about 20 percent of oxide of metal selected from the group consisting of calcium, magnesium, aluminum and copper and being sufficient to reduce the rate of solution of the glass in water, and the $P_2O_5$ content being at least 50 percent and up to about 70 percent, said molded bodies being moderately internally stressed whereby they have superior resistance to cracking on prolonged contact with brine at 90° C., as compared to corresponding bodies substantially free of internal stress.

2. Molded bodies as in claim 1, having at least one axis or plane of symmetry, being about 3 to 40 mm. in diameter, and having moderate internal stress.

3. Molded bodies as in claim 1 which are radially substantially symmetrical.

4. Molded bodies as in claim 1 having at least one substantially circular cross section.

5. Spheroidal molded bodies as in claim 1.

6. Cast pellets as in claim 1.

7. Pellets as in claim 6 in which the ratio of length to thickness is about 8:1 to 1:1, and the thickness is at least about 6 mm.

8. A mass or bed of any individual smooth-surfaced molded bodies as in claim 1, said bodies being substantially uniform in size and shape.

9. Pellets as in claim 7 in which the proportion of the total $P_2O_5$ which is present as orthophosphates and pyrophosphates is less than 20 percent.

10. Pellets as in claim 9 in which the glass has the following weight percent composition: 4 $Al_2O_3$, 8 CaO, 21 $Na_2O$, 67 $P_2O_5$

* * * * *

UNITED STATES PATENT OFFICE
CERTIFICATE OF CORRECTION

Patent No. 3,640,827     Dated 2/8/72

Inventor(s) Charles W. Lutz

It is certified that error appears in the above-identified patent and that said Letters Patent are hereby corrected as shown below:

Column 1, line 6 "multiple" should read --multiply--.

Column 4, line 68 "or" second occurrence should read -- of --.

Column 5, line 72 "Al$_2$O$_3$3H$_2$O" should read --Al$_2$O$_3$·3H$_2$O--.

Column 5, line 74 "Ca(H$_2$PO$_4$)$_2$H$_2$O" should read --Ca(H$_2$PO$_4$)$_2$·H$_2$O--.

Column 8, line 30 "70,41" should read --70.41--.

Column 9, line 20 "3,62" should read --3.62--.

Column 9, line 36 "0.05 CaO" should read --0.05 CoO--.

Column 10, line 30 "compressive" should read --tensile--.

Column 10, line 40 "200°C" should read --100°C--.

Column 10, line 64 "the" should read --The--.

UNITED STATES PATENT OFFICE
CERTIFICATE OF CORRECTION

Patent No. 3,640,827　　　　　　　　　Dated　2/8/72

Inventor(s)　Charles W. Lutz

It is certified that error appears in the above-identified patent and that said Letters Patent are hereby corrected as shown below:

Column 11, line 26 after "orthophosphates" insert --and pyrophosphates--.

Column 12, line 2 "sown" should read --shown--.

Column 12, line 18 "meal" should read --metal--.

Column 12, line 39 "any" should read --many--.

Signed and sealed this 23rd day of April 1974.

(SEAL)
Attest:

EDWARD M. FLETCHER, JR.　　　　　　　C. MARSHALL DANN
Attesting Officer　　　　　　　　　　Commissioner of Patents